United States Patent
Yang

(10) Patent No.: US 8,605,834 B1
(45) Date of Patent: *Dec. 10, 2013

(54) METHOD AND SYSTEM FOR GENERATING INFORMATION FOR USE IN DETECTING A SIGNAL

(75) Inventor: Zhiyu Yang, Cupertino, CA (US)

(73) Assignee: Marvell International Ltd., Hamilton (BM)

(*) Notice: Subject to any disclaimer, the term of this patent is extended or adjusted under 35 U.S.C. 154(b) by 0 days.

This patent is subject to a terminal disclaimer.

(21) Appl. No.: 13/619,617

(22) Filed: Sep. 14, 2012

Related U.S. Application Data

(63) Continuation of application No. 12/020,327, filed on Jan. 25, 2008, now Pat. No. 8,300,740.

(60) Provisional application No. 60/886,831, filed on Jan. 26, 2007.

(51) Int. Cl.
*H04B 1/707* (2011.01)
*H03D 1/00* (2006.01)

(52) U.S. Cl.
USPC .......................................................... 375/343

(58) Field of Classification Search
USPC .......... 375/150, 147, 140, 130, 343, 340, 316
See application file for complete search history.

(56) References Cited

U.S. PATENT DOCUMENTS

| | | | |
|---|---|---|---|
| 8,300,740 B1* | 10/2012 | Yang | 375/343 |
| 2003/0161428 A1 | 8/2003 | Garrett et al. | |
| 2004/0098652 A1 | 5/2004 | Sternberg et al. | |
| 2004/0120630 A1 | 6/2004 | Abrams et al. | |
| 2004/0187162 A1* | 9/2004 | Wu et al. | 725/116 |
| 2004/0258131 A1* | 12/2004 | Margon | 375/130 |
| 2006/0023772 A1* | 2/2006 | Mudulodu et al. | 375/144 |
| 2007/0041474 A1* | 2/2007 | Gurney et al. | 375/332 |

FOREIGN PATENT DOCUMENTS

JP 2001-036451 A 2/2001

\* cited by examiner

*Primary Examiner* — Kevin M Burd

(57) ABSTRACT

In a method for generating a signal quality indicator, a correlation signal is generated from a received signal and a spreading sequence. A magnitude signal is generated from the correlation signal. A time-domain averaged signal is generated based on the magnitude signal and at least a first time delayed version of the magnitude signal delayed by at least one symbol period. A peak-to-average signal is generated based on the time-domain averaged signal.

9 Claims, 13 Drawing Sheets

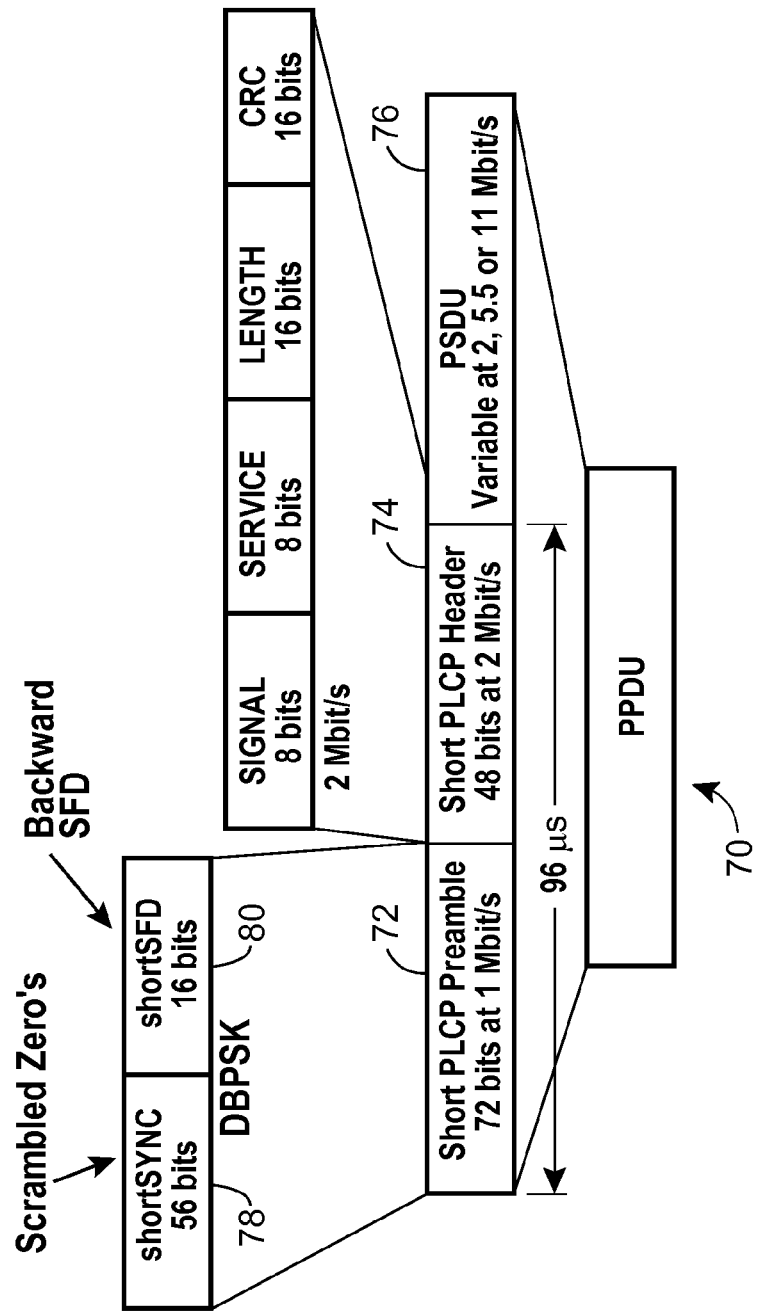

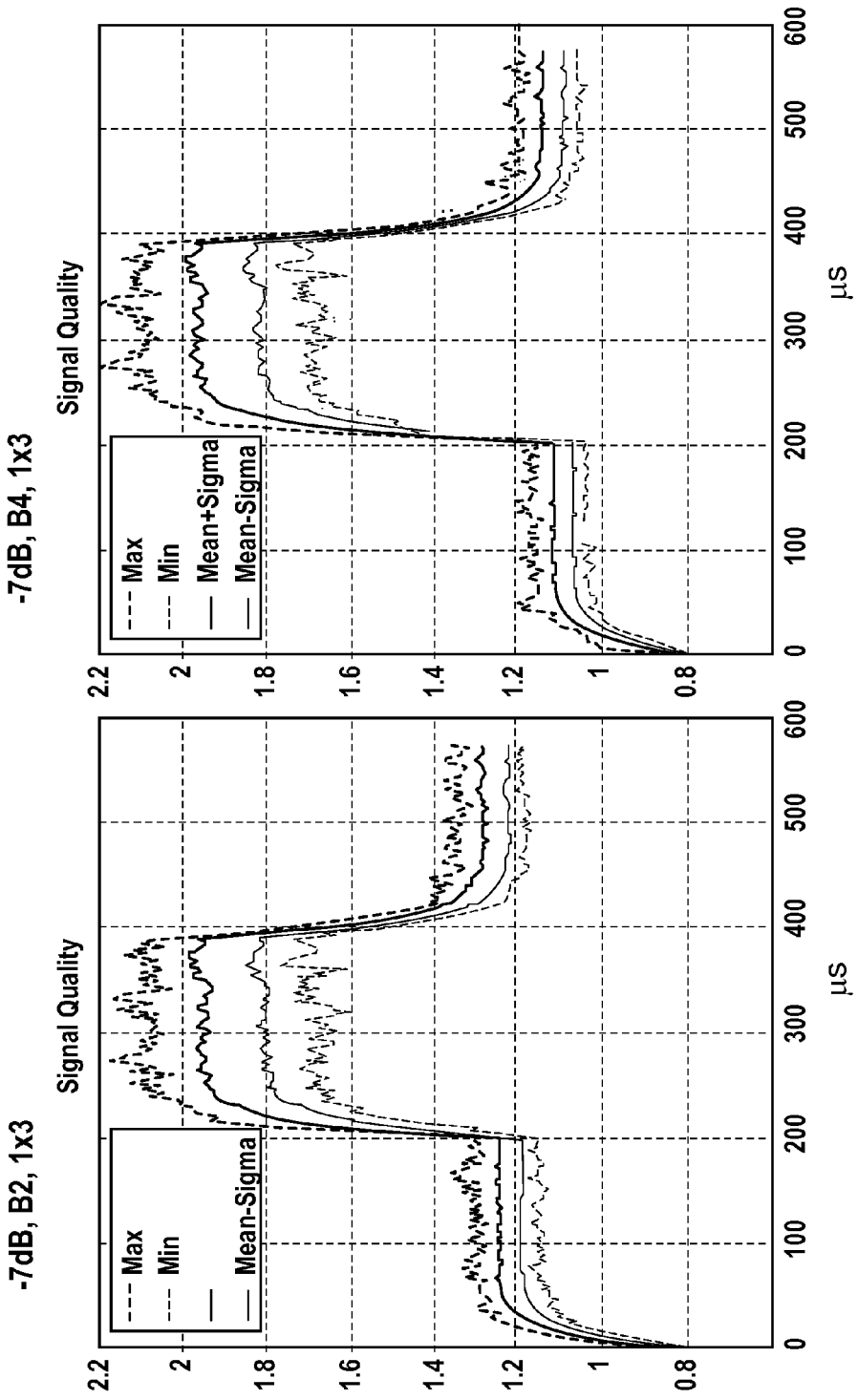

METHOD AND SYSTEM FOR GENERATING INFORMATION FOR USE IN DETECTING A SIGNAL

CROSS-REFERENCE TO RELATED APPLICATIONS

The present application is a continuation of U.S. patent application Ser. No. 12/020,327, entitled "Method and System for Generating Information for Use in Detecting a Signal," filed on Jan. 25, 2008, now U.S. Pat. No. 8,300,740, which claims the benefit of U.S. Provisional Patent Application No. 60/886,831, entitled "Detecting 802.11b Packets in WLAN," which was filed on Jan. 26, 2007. Both of the above referenced applications are hereby incorporated by reference herein in their entireties.

FIELD OF TECHNOLOGY

The present disclosure relates generally to detecting a received signal in a communications system.

BACKGROUND

In some communication systems, a known pattern of symbols is used to indicate the beginning of a block of transmitted information, such as a transmitted packet. This may facilitate detection of the block, establishing symbol synchronization, etc. In present wireless local area network (WLAN) systems, for example, transmitters transmit packets having preambles. These preambles may include a known pattern of symbols. In such systems, a receiver may monitor the received signal in order to detect packets, and, in particular, may process the received signal to detect the preamble of a packet which indicates the beginning of the packet.

As an example, the Institute for Electrical and Electronics Engineers (IEEE) 802.11b wireless local area network (WLAN) standard specifies a protocol for WLAN systems and includes the use of patterns of symbols (e.g., preambles) to facilitate signal detection. According to the IEEE 802.11b WLAN standard, data is transmitted in packets, and the format of such packets is illustrated in FIGS. 1A and 1B. FIG. 1A is an illustration of an IEEE 802.11b packet 50 in a long preamble format. The packet 50 includes a preamble field 52, a header field 54, and a data field 56. The preamble field 52 includes a synchronization (SYNC) field 58 and a start frame delimiter (SFD) field 60. The SYNC field 58 includes a sequence of scrambled 1's and the SFD field 60 includes a known pattern of 1's and 0's. Each symbol in the SYNC field 58 and the SFD field 60 is spread by a length-11 Barker code sequence. FIG. 1B is an illustration of an IEEE 802.11b packet 70 in a short preamble format. The packet 70 includes a preamble field 72, a header field 74, and a data field 76. The preamble field 72 includes a SYNC field 78 and an SFD field 80. The SYNC field 78 includes a sequence of scrambled 0's, and the SFD field 80 includes a known pattern of 1's and 0's. Each symbol in the SYNC field 78 and the SFD field 80 is spread by the length-11 Barker code sequence.

At a receiver, the received signal may be cross-correlated with the Barker code sequence in order to detect preamble fields. As a received preamble is cross-correlated with the Barker code sequence, a peak will occur when the Barker code and a symbol of the preamble field overlap. Detection such peaks are used to detect the preamble generate the synchronization and timing information. When no signal is present or when the signal-to-noise level is poor, no peak or only small peaks may occur. A relative height of a peak generally is a peak-to-average measure of the cross-correlation signal.

A prior art apparatus 100 for generating synchronization information for a received signal that was transmitted according to the IEEE 802.11b protocol is illustrated in FIG. 2. The apparatus 100 generates a signal quality (SQ) signal, which is generally based on a cross-correlation of the Barker code sequence with the received signal. The apparatus 100 includes an analog-to-digital converter (ADC) 102 that converts an analog, down-converted I/Q signal to a digital I/Q signal at a sampling rate of 22 MHz. A Barker correlator 104 receives the digital I/Q signal and cross-correlates it with the Barker code sequence. FIG. 3 is a graph of an example output of the Barker correlator 104. In particular, FIG. 3 illustrates an I component correlation output corresponding to a received signal with a 1 MHz symbol rate. As can be seen in FIG. 3, a peak occurs approximately every 22 samples (which corresponds to 1 MHz).

Referring again to FIG. 2, a magnitude calculator 106 receives the output of the Barker correlator 104 and generates a magnitude signal. In particular, the magnitude calculator 106 generates the magnitude signal by adding the magnitude of the I component to the magnitude of the Q component. Then, a peak-to-average calculator 108 generates a peak-to-average signal, which generally provides a measure of the relative heights of peaks in the magnitude signal. The peak-to-average signal may be referred to as a signal quality (SQ) signal, and may be generated as:

$$SQ = \frac{\max_i(|I_i| + |Q_i|)}{\frac{1}{16}\left(\sum_i |I_i| + |Q_i| - 2\max_i(|I_i| + |Q_i|)\right)}, \quad \text{(Equ. 1a)}$$

$$SQ = \frac{\max_i(\text{magnitude}_i)}{\frac{1}{16}\left(\sum_i \text{magnitude}_i - 2\max_i(\text{magnitude}_i)\right)}, \quad \text{(Equ. 1b)}$$

where i is an index from 0 to 21, and magnitude is the output of the magnitude calculator 106. Next, the SQ signal is compared to a threshold by a comparator 110. When the SQ signal exceeds the threshold, this may indicate the presence of a symbol and provide timing information regarding the symbol. SQ signal also can be used for Clear Channel Assessment (CCA).

SUMMARY OF THE DISCLOSURE

In one embodiment, a method of generating a signal quality indicator may comprise generating a correlation signal from a received signal and a spreading sequence, and generating a magnitude signal from the correlation signal. The method also may comprise generating a time-domain averaged signal based on the magnitude signal and at least a first time delayed version of the magnitude signal delayed by at least one symbol period. Additionally, the method may comprise generating a peak-to-average signal based on the time-domain averaged signal.

In another embodiment, a method of generating information for use in detecting a signal may include generating a plurality of respective correlation signals from a plurality of received signals and a spreading sequence, wherein the plurality of received signals correspond to a plurality of respective antennas. The method also may include generating a plurality of respective magnitude signals from the plurality of correlation signals, and generating a spatial-domain averaged signal based on the plurality of magnitude signals. Further, the method may include generating a multiple antenna peak-to-average signal based on the spatial-domain averaged signal.

In yet another embodiment, a system for generating a signal quality indicator may comprise a correlator to correlate a received signal with a spreading sequence, and a magnitude calculator to generate a magnitude signal based on an output of the correlator. Also, the system may comprise a time-domain averaging unit to generate a time domain averaged signal based on the magnitude signal and at least a first time delayed version of the magnitude signal delayed by at least one symbol period. Further, the system may comprise a peak-to-average signal generator to generate a peak-to-average signal based on the time domain averaged signal.

In still another embodiment, a system for generating information for use in detecting a signal may include a plurality of correlators to correlate respective signals corresponding to a plurality of antennas with a spreading sequence, and a plurality of magnitude calculators, each magnitude calculator coupled to a respective one of the plurality of correlators, to generate a plurality of magnitude signals based on outputs of the plurality of correlators. Additionally, the system may include a spatial-domain averaging unit coupled to the plurality of magnitude calculators to generate a spatial domain averaged signal based on outputs of the plurality of magnitude calculators. Also, the system may include a multiple antenna peak-to-average signal generator to generate a multiple antenna peak-to-average signal based on the spatial domain averaged signal.

BRIEF DESCRIPTION OF THE DRAWINGS

FIG. 1B is a diagram illustrating the short frame format of packets in the IEEE 802.11b protocol;

FIGS. 6A and 6B are graphs of signal quality (SQ) signals generated in simulations of a system such as the example system of FIG. 5;

DETAILED DESCRIPTION

Embodiments of a system and method described below enable a device, such as a wireless access point in a wireless network, etc. to more reliably and sensitively detect a data unit such as a packet. In the embodiments described below, transmitted signals are analyzed for the presence of a data unit by generating a signal quality (SQ) signal and detecting peaks in the SQ signal. Various example techniques for generating an SQ signal and detecting peaks in the SQ signal are described below, and these techniques may be utilized individually or in various combinations.

Figure 1A:
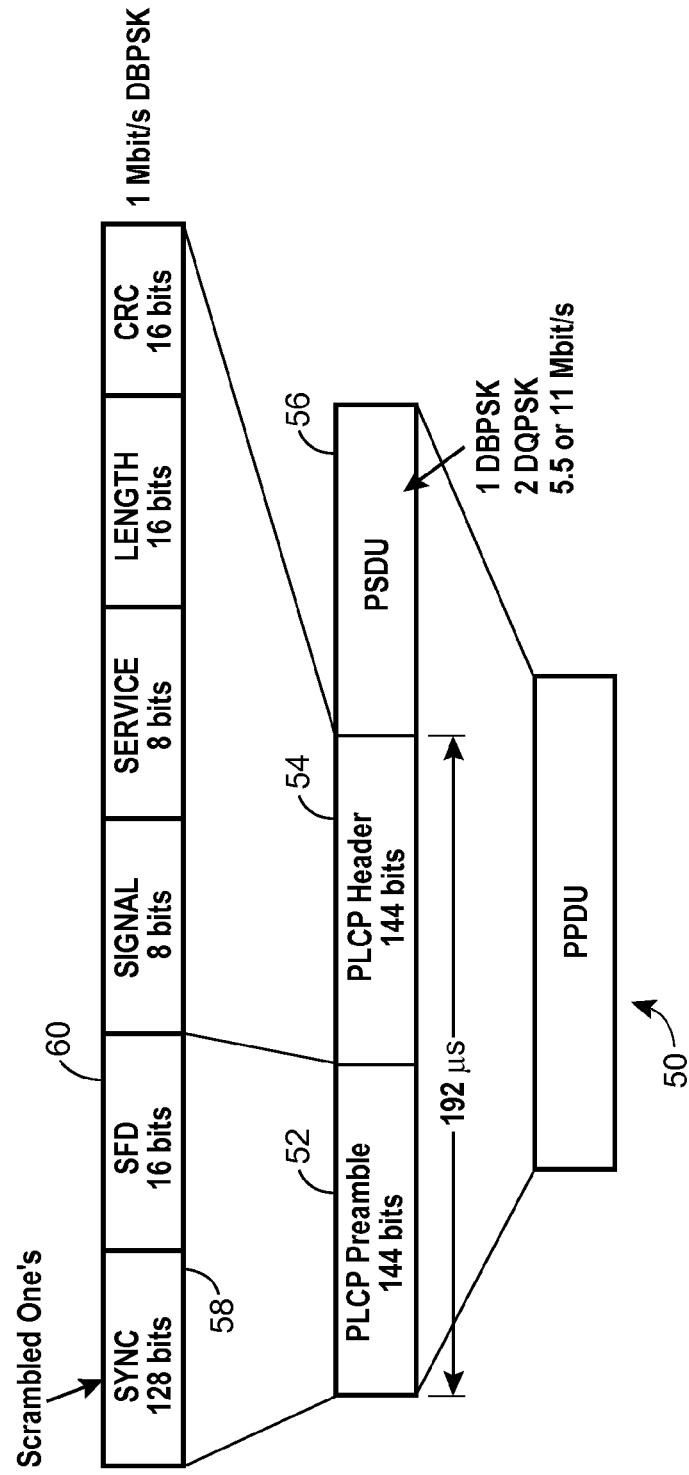
FIG. 1A is a diagram illustrating the long frame format of packets in the IEEE 802.11b protocol.
Figure 2:
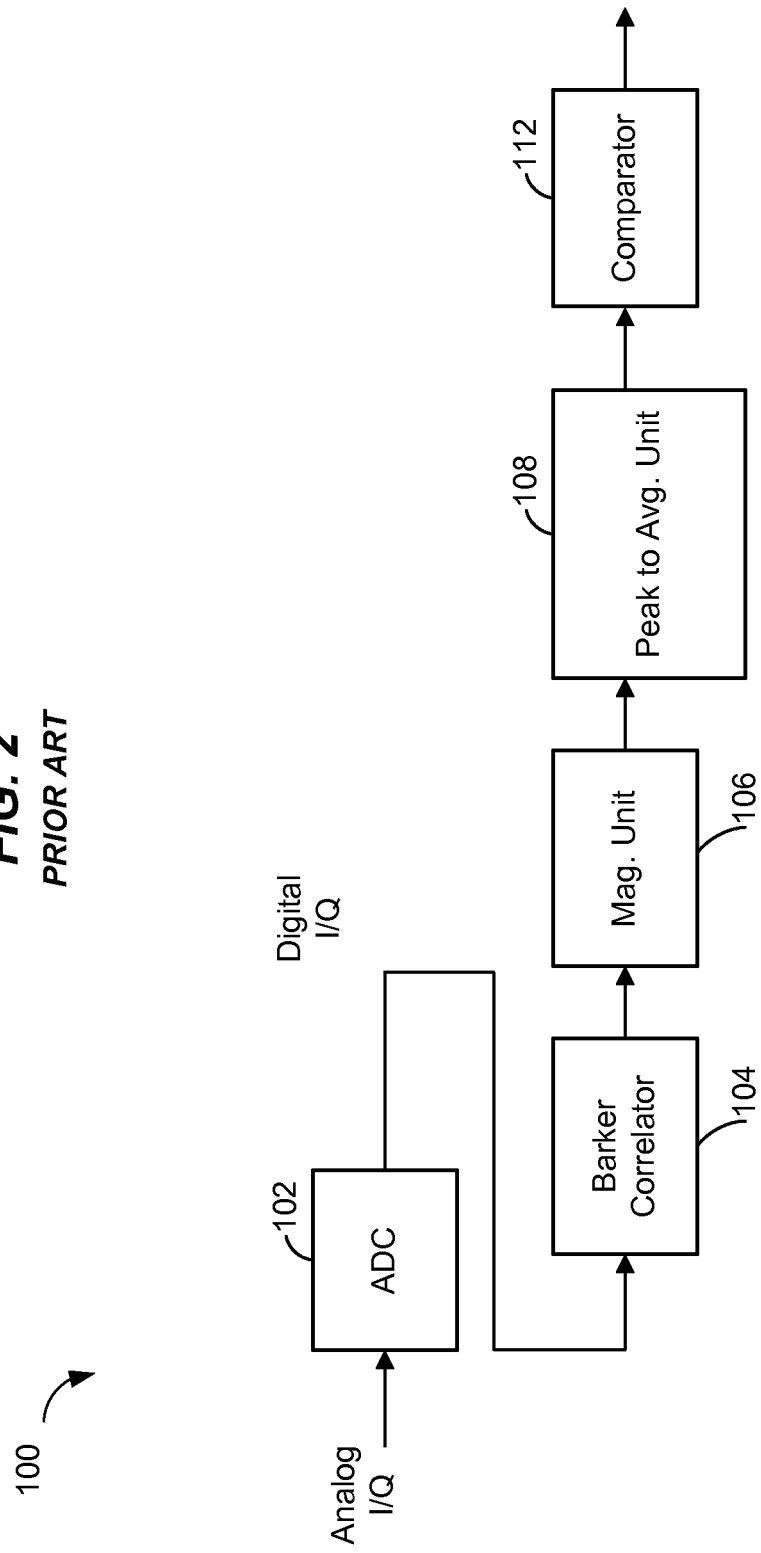
FIG. 2 is a diagram illustrating a prior art system for detecting IEEE 802.11b packets in a Wireless Local Area Network (WLAN)
Figure 3:
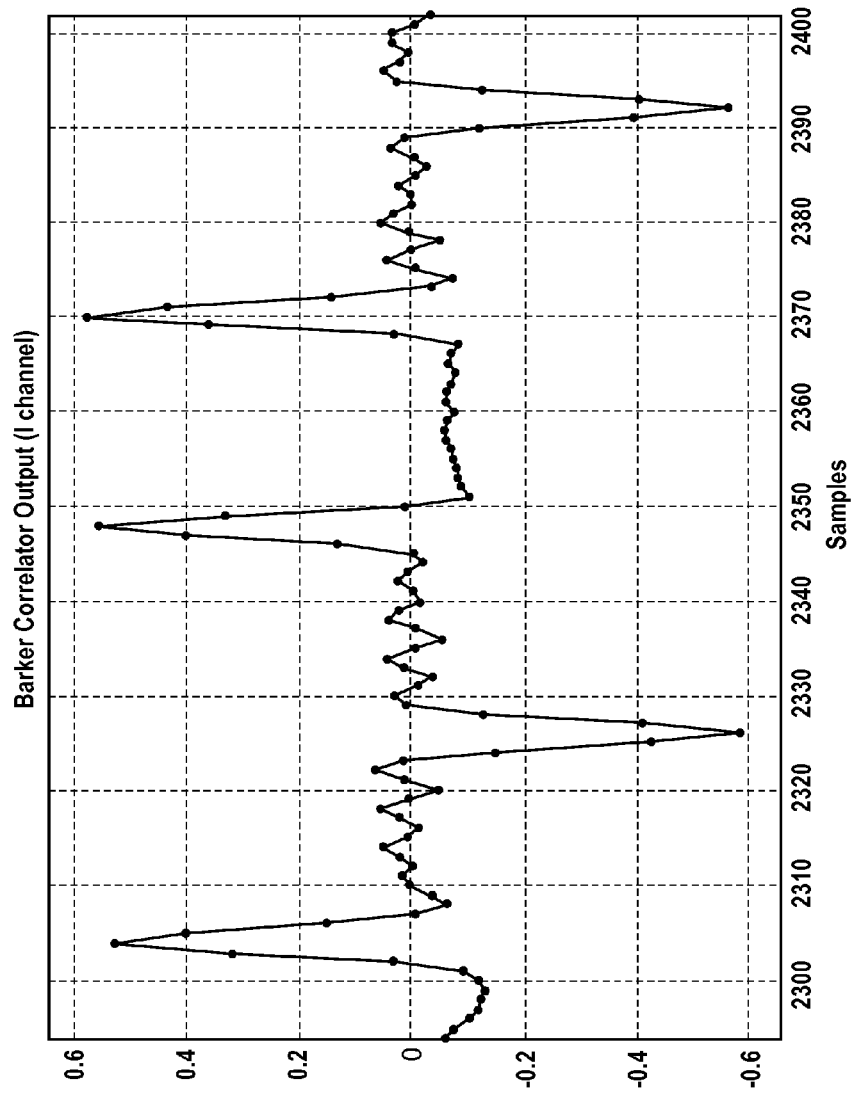
FIG. 3 is an illustration of the output of a signal after being processed by the Barker correlator of FIG. 2.
Figure 4:
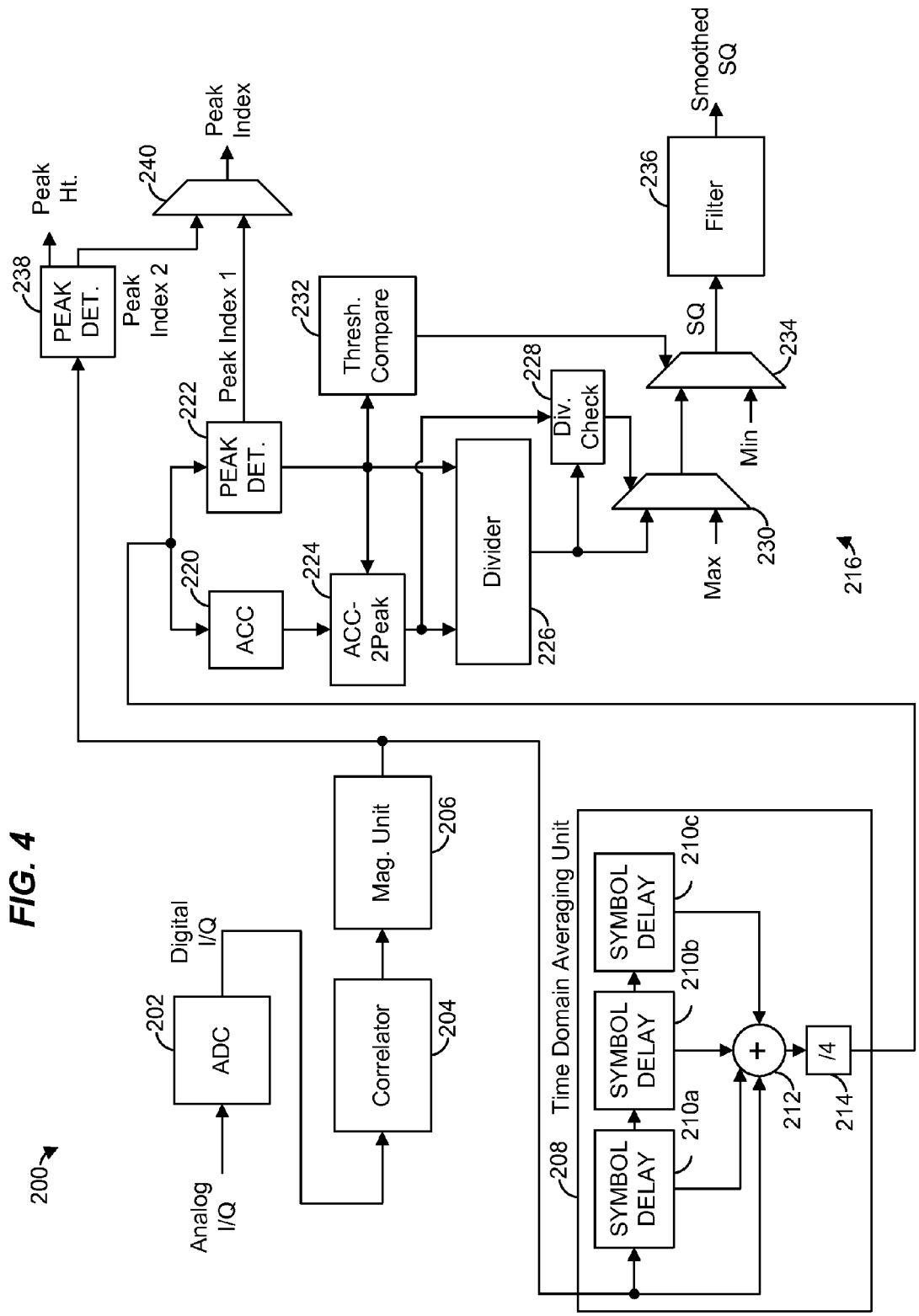
FIG. 4 is a block diagram of an example system for generating a peak-to-average signal.

An example apparatus 200 for generating synchronization information for a received signal that was transmitted according to the IEEE 802.11b protocol is illustrated in FIG. 4. The apparatus 200 generates a signal quality (SQ) signal, which is generally based on a cross-correlation of the Barker code sequence with the received signal. The apparatus 200 includes an analog-to-digital converter (ADC) 202 that converts an analog, down-converted I/Q signal to a digital I/Q signal at a sampling rate of 22 MHz. In other implementations, different sampling rates may be utilized, such as a multiple of 11 MHz (e.g., 11 MHz, 33 MHz, 44 MHz, etc.) or a sampling rate that is not a multiple of 11 MHz. A Barker correlator 204 receives the digital I/Q signal and cross-correlates it with the Barker code sequence. A magnitude calculator 206 receives the output of the Barker correlator 104 and generates a magnitude signal. In one implementation, the magnitude calculator 206 may generate the magnitude signal according to:

$$\text{Magnitude} = \max(|I|, |Q|) + \frac{13}{32}\min(|I|, |Q|), \quad \text{(Equ. 2)}$$

In other implementations, the magnitude signal may be generated in other ways, such as according to techniques known to those of ordinary skill in the art. For example, the magnitude calculator 206 alternatively may generate the magnitude signal by adding the magnitude of the I component to the magnitude of the Q component, or determining the magnitude of the complex I/Q signal.

An output of the magnitude calculator 206 is provided to a time domain averaging unit 208. In the example implementation of FIG. 4, the time domain averaging unit 208 includes three symbol delay units 210a, 210b and 210c, which are coupled in series. For a sampling rate of 22 MHz, each of the symbol delay units 210a, 210b and 210c may include 22 individual sample delay units coupled in series. The magnitude calculator 206 also includes an adder 212 and a divide-by-four unit 214. The adder 212 receives the output of the magnitude calculator 206, as well as the outputs of the symbol delay units 210a, 210b and 210c and generates an addition output. The divide-by-four unit 214 divides the output of the adder 212 by four. In operation, the time domain averaging unit 208 generates an average of multiple magnitude samples corresponding to multiple symbol periods. Although in FIG. 4 the time domain averaging unit 208 generates an average corresponding to four symbol periods, averages corresponding to more or less symbol periods may be generated. For example, averages corresponding to 2, 3, 5, 6, 7, 8, etc. symbol periods may be generated, although in general it may be easier to implement averages from numbers of symbols that are powers of two (e.g., 2, 4, 8, . . . ). Increasing the number of symbols over which the magnitude signal is averaged generally increases sensitivity, but also increases delay. Additionally, the time domain averaging unit 208 may generate a weighted average.

The output of the time domain averaging unit 208 is provided to an SQ calculating unit 216. The SQ calculating unit 216 includes an accumulator 220 and a peak detector 222. The peak detector 222 detects peaks in the output of the time domain averaging unit 208 and generates a signal (Peak Index 1) that indicates when a peak has been detected. It also generates a signal that indicates the magnitude of the peak, and that signal is provided to a divider 226. The accumulator 220 generates an accumulation of the output of the time domain averaging unit 208 corresponding to a symbol length (e.g., 22 output samples for a sampling rate of 22 MHz). In other implementations, the accumulator 220 may accumulate a number of output samples that corresponds to less than a symbol length. A subtractor unit 224 is coupled to the accumulator 220 and the peak detector 222. The subtractor unit 224 subtracts two times the peak magnitude from the output of the accumulator 220. The divider 226 is coupled to the peak detector 222 and the subtractor 224, and divides the peak magnitude by the output of the subtractor 224. It may also multiply the result by a value such as 16. Generally, the divider may generate a peak-to-average signal according to the equation 1b, or another suitable peak-to-average generation equation.

The SQ calculating unit 216 may also include a division check unit 228 coupled to the subtractor unit 224 and the divider 226. The division check unit 228 may check whether the output of the subtractor unit 224 is greater than or equal to zero. It may also check whether the output of the divider 226 is saturated. The division check unit 228 may generate a signal that indicates whether the output of the subtractor unit 224 is greater than or equal to zero and the division output is not saturated. This signal may be used to control a multiplexer 230 that selects the output of the divider 226 or a maximum value. In particular, if the output of the subtractor unit 224 is greater than or equal to zero and the division output is not saturated, the divider 226 output is selected. Otherwise, the maximum value is selected. In other implementations, the division check unit 228 may merely check whether the output of the subtractor unit 224 is greater than or equal to zero.

The SQ calculating unit 216 may also include a threshold compare unit 232 coupled to the output of the peak detector 222 and determines whether the magnitude of the detected peak is greater than a threshold. The threshold compare unit 232 may generate a control signal indicating whether the magnitude of the detected peak is greater than the threshold. This control signal may control a multiplexer 234 that selects the output of the multiplexer 230 or a minimum value. In particular, if the output of the peak detector 222 is greater than the threshold, the multiplexer 230 output is selected. Otherwise, the minimum value is selected. In some implementations, the threshold compare unit 232 and the multiplexer 234 may be omitted.

The output of the multiplexer 234 (or the multiplexer 230 is the multiplexer 234 is omitted) is a signal quality (SQ) signal. The SQ calculating unit 216 may also include a filter 236 to smooth the SQ signal to generate a smoothed SQ signal. The filter 236 may be a low pass infinite impulse response (IIR) filter, for example. Other types of filters may also be utilized such as finite impulse response (FIR) filters. In some implementations, the filter 236 may be omitted.

The SQ calculating unit 216 may also include a peak detection unit 238 that is similar to the peak detection unit 222. The peak detection unit 238 is coupled to the magnitude calculator 206 and detects peaks in the magnitude signal. It may generate a signal (Peak Index 2) that indicates when a peak has been detected in the magnitude signal. It also may generate a peak height signal that indicates the magnitude of the peak. The Peak Index 2 signal may be provided as an input to a multiplexer 240. The multiplexer 240 may also receive as an input the Peak Index 1 signal. The multiplexer 240 may select as a Peak Index signal either the Peak Index 1 signal or the Peak Index 2 signal based on a control signal (not shown). In some implementations, the peak detector 238 and the multiplexer 240 may be omitted.

Figure 5:
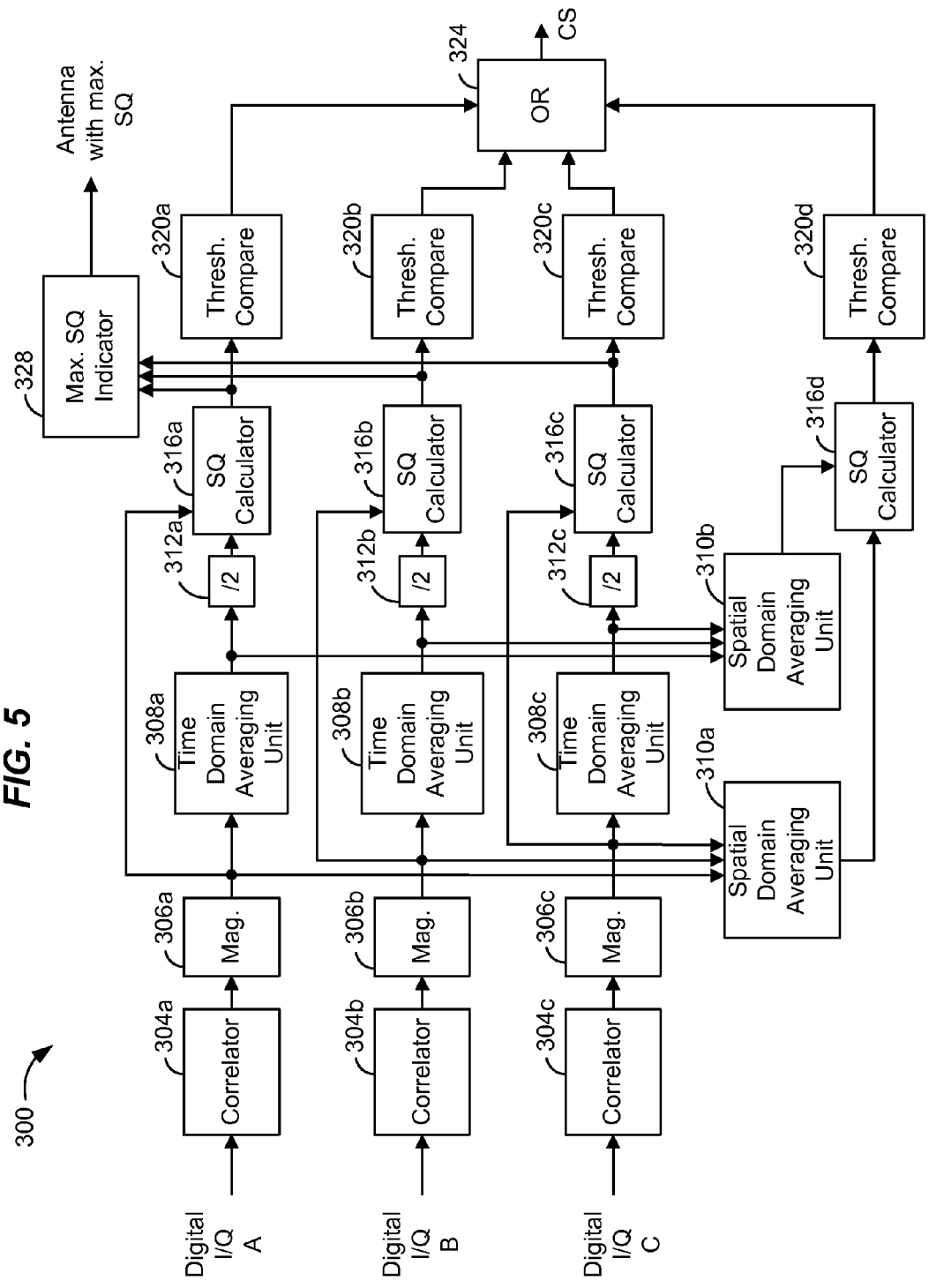
FIG. 5 is a block diagram of an example system for generating information for use in detecting a signal.

The example apparatus 200 may be utilized in a receiver that includes one antenna or multiple antennas, such as a receiver configured to communicate according to the draft IEEE 802.11n protocol. FIG. 5 is an example implementation of a carrier sense (CS) indictor generating system 300 for a receiver that includes three antennas. The receiver 300 includes three I/Q inputs (Digital I/Q A, Digital I/Q B and Digital I/Q C) corresponding to the three antennas.

The system 300 includes Barker correlators 304a, 304b and 304c respectively coupled to magnitude calculators 306a, 306b and 306c. The Barker correlators 304 and the magnitude calculators 306 may be the same as or similar to the Barker correlator 204 and the magnitude calculator 306, respectively, of FIG. 4, for example. Outputs of the magnitude calculators 306a, 306b and 306c may be provided to time domain averaging units 308a, 308b and 308c, respectively. The time domain averaging units 308 may be the same as or similar to the time domain averaging unit 208 of FIG. 4, for example, except that each of the time domain averaging units 308 includes a divide-by-two unit rather than a divide-by-four unit 214.

Outputs of the magnitude calculators 306a, 306b and 306c may be provided to a spatial domain averaging unit 310a. The spatial domain averaging unit 310a may include an adder that adds together the three outputs of magnitude calculators 306a, 306b and 306c. The spatial domain averaging unit 310a also may include a divider coupled to the adder that divides the output of the adder by a number such as two (which one of ordinary skill in the art will recognize can be easily implemented). In other implementations, the divider could divide by a number other than two. In operation, the spatial domain averaging unit 310a essentially averages the correlation magnitude signals corresponding to the three antennas. In other implementations, the spatial domain averaging unit 310a may generate a weighted average of the correlation magnitude signals corresponding to the three antennas. In some implementations, the spatial domain averaging unit 310a may be omitted.

Similarly, outputs of the time domain averaging units 308a, 308b and 308c may be provided to a spatial domain averaging unit 310b. The spatial domain averaging unit 310b may include an adder that adds together the three outputs of the time domain averaging units 308a, 308b and 308c. The spatial domain averaging unit 310b also may include a divider coupled to the adder that divides the output of the adder by a number such as four (which one of ordinary skill in the art will recognize can be easily implemented). In other implementations, the divider could divide by a number other than four. In operation, the spatial domain averaging unit 310b essentially averages the time domain averaged correlation magnitude signals corresponding to the three antennas. In other implementations, the spatial domain averaging unit 310b may generate a weighted average of the time domain averaged correlation magnitude signals corresponding to the three antennas. In some implementations, the spatial domain averaging unit 310b may be omitted.

The outputs of the time domain averaging units 308a, 308b and 308c may also be provided to three divide-by-two units 312a, 312b and 312c, respectively. Outputs of the divide-by-two units 312a, 312b and 312c may be provided to SQ calculation units 316a, 316b and 316c, respectively. Additionally, the outputs of the magnitude calculators 306a, 306b and 306c may be provided to SQ calculation units 316a, 316b and 316c, respectively. The SQ generators 316a, 316b and 316c each may be the same as or similar to the SQ generator 216 of FIG. 4, for example. In such an implementation, the outputs of the divide-by-two units 312a, 312b and 312c may be coupled to respective accumulators, such as the accumulator 220 of FIG. 4, and coupled to respective peak detectors, such as the peak detector 222 of FIG. 4. Also, the outputs of the magnitude calculators 306a, 306b and 306c may be coupled to respective peak detectors such as the peak detector 238 of FIG. 4. In such an implementation, the SQ calculation units 316 may generate smoothed SQ signals. In the example implementation of FIG. 5, each of the SQ calculation units 316 also generates an indicator of the location of a peak in the corresponding SQ signal (e.g., Peak Index, Peak Index 1, or Peak Index 2 of FIG. 4). Further, in the example implementation of FIG. 5, each of the SQ calculation units 316 also generates a measure of the height of peaks in the signal from the corresponding magnitude calculator 306. In other implementations, different SQ calculation units could be utilized, such as a prior art SQ calculation units.

The system 300 also may include an SQ calculation unit 316d coupled to the spatial domain averaging units 310. The SQ calculation unit 316d may be the same as or similar to the SQ calculation unit 216 of FIG. 4. For example, if both of the spatial domain averaging units 310 are included, the output of the spatial domain averaging unit 310b may be coupled to an accumulator, such as the accumulator 220 of FIG. 4, and coupled to a peak detector, such as the peak detector 222 of FIG. 4. Also, the output of the spatial domain averaging unit 310a may be coupled to a peak detector such as the peak detector 238 of FIG. 4. If both of the spatial domain averaging units 310 are omitted, the SQ calculation unit 316d may also be omitted.

The system 300 may further include threshold compare units 320a, 320b, 320c and 320d coupled to the SQ calculation units 316a, 316b, 316c and 316d, respectively. For example, each SQ calculation unit 316 may provide one or more of an SQ signal, a smoothed SQ signal, a peak height signal, a indicator of a location of a peak in the corresponding SQ signal or peak height signal, etc., to the corresponding threshold compare unit 320. The threshold compare unit 320 compares the SQ signal to a threshold, and generates a signal indicating whether the SQ signal exceeded the threshold. Each of the threshold compare units 320 may compare the respective SQ signals to the same threshold or different thresholds. In one implementation, the threshold compare units 320a, 320b and 320c utilize a first threshold, whereas the threshold compare unit 320d utilizes a second threshold that may be different than the first threshold. Outputs of the threshold compare units 320 may be provided to an OR block 324 that generates an indicator of whether any of the SQ signals exceeded a threshold. The generated indicator may be a carrier sense (CS) signal, for example.

The system 300 also may include a maximum SQ indicator generator 328 coupled to the SQ calculation units 316. For example, each SQ calculation unit 316 may provide one or more of an SQ signal, a smoothed SQ signal, a peak height signal, etc. to the maximum SQ indicator generator 328, which may then determine which antenna corresponds to the maximum SQ signal, a smoothed SQ signal, a peak height signal, etc. Additionally, the maximum SQ indicator generator 328 may generate a signal that indicates which antenna corresponds to the maximum SQ signal, a smoothed SQ signal, a peak height signal, etc. This may be useful if it is necessary or desirable to select one received signal corresponding to one of the multiple antennas for further processing, for example (see e.g., U.S. Provisional Patent Application No. 60/939,712, entitled "Transmit Beamforming for DSSS/CCK (802.11b) Systems with Multiple Transmit Antennas," filed on May 23, 2007, owned by the assignee of the present application). In other implementations, the maximum SQ indicator generator 328 may be omitted.

In operation, the system 300 may generate a first SQ signal, a first smoothed SQ signal, and/or a first peak height signal (i.e., one or more outputs of the SQ calculation unit 316a) corresponding to an antenna A. Similarly, the system 300 may generate a second SQ signal, a second smoothed SQ signal, and/or a second peak height signal (i.e., one or more outputs of the SQ calculation unit 316b) corresponding to an antenna B. Also, the system 300 may generate a third SQ signal, a third smoothed SQ signal, and/or a third peak height signal (i.e., one or more outputs of the SQ calculation unit 316c) corresponding to an antenna C. Further, the system 300 may generate a fourth SQ signal, a fourth smoothed SQ signal, and/or a fourth peak height signal (i.e., one or more outputs of the SQ calculation unit 316d) corresponding to an average of the correlation magnitude signals for antennas A, B and C. These signals may be compared to thresholds in order to generate a CS signal.

If there is a failure in one of the signal paths corresponding to the antennas A, B and C, the SQ signal corresponding to the spatial averaged correlation magnitude signal may be lowered and thus may fail to exceed the corresponding threshold. For example, if antenna A becomes damaged, the threshold compare units 320a and 320d may fail to detect that the corresponding thresholds were exceeded. On the other hand, the threshold compare units 320b and 320c may detect that their corresponding thresholds were exceeded. Thus, the signal may be detected even though antenna A had failed.

Although the example system 300 corresponds to a receiver having three antennas, other implementations may be utilized with receivers having different numbers of antennas such as two, four, five, six, etc.

FIG. 6A is a graph illustrating 200 simulations of generation of a smoothed SQ signal by a system similar to the system 300 of FIG. 5. In particular, the graph of FIG. 6A corresponds to a received signal having a signal-to-noise ration of −7 dB, a receiver having three antennas, and utilizing time domain averaging over two symbols. The graph of FIG. 6A includes four statistical representative results from the 200 simulations. The graph includes one SQ pulse with the maximum height over the 200 simulations, one SQ pulse with the minimum height, an average of the 200 simulations plus one standard deviation, and the average of the 200 simulations minus one standard deviation.

FIG. 6B is a graph similar to the graph of FIG. 6A, but illustrating 200 simulations in which time domain averaging over four symbols was utilized. As can be seen in comparing FIGS. 6A and 6B, the peak heights are taller with time domain averaging over four symbols as compared to time domain averaging over two symbols.

Figure 7A:
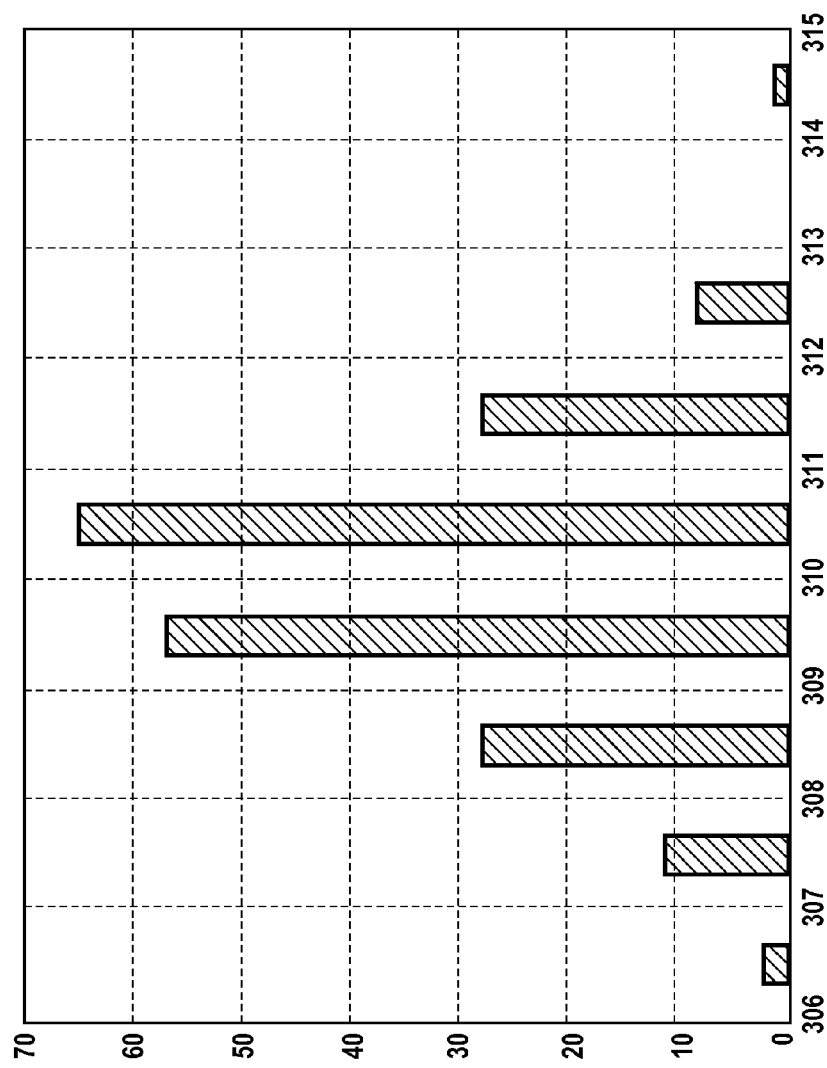
FIGS. 7A, 7B, and 7C are graphs of signal detection times from simulations of a system such as the example system of FIG. 5.
Figure 7B:
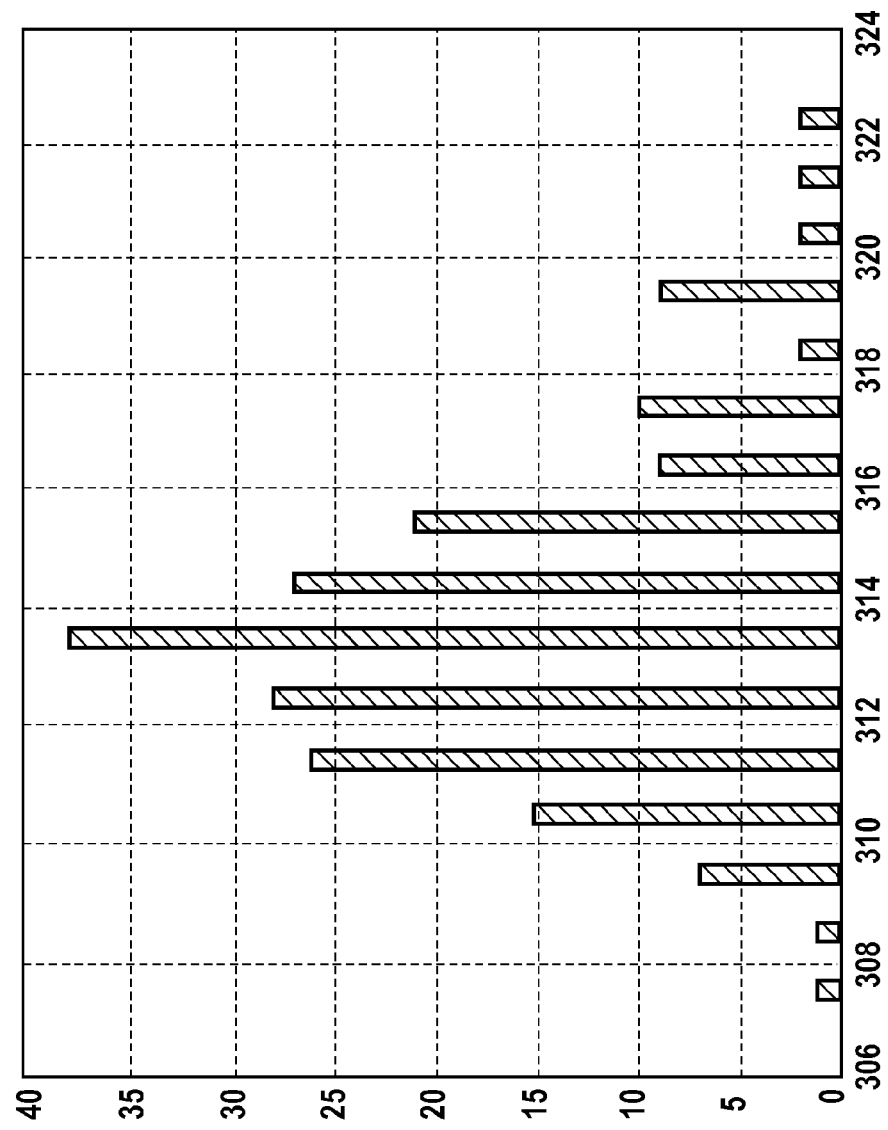
Figure 7C:
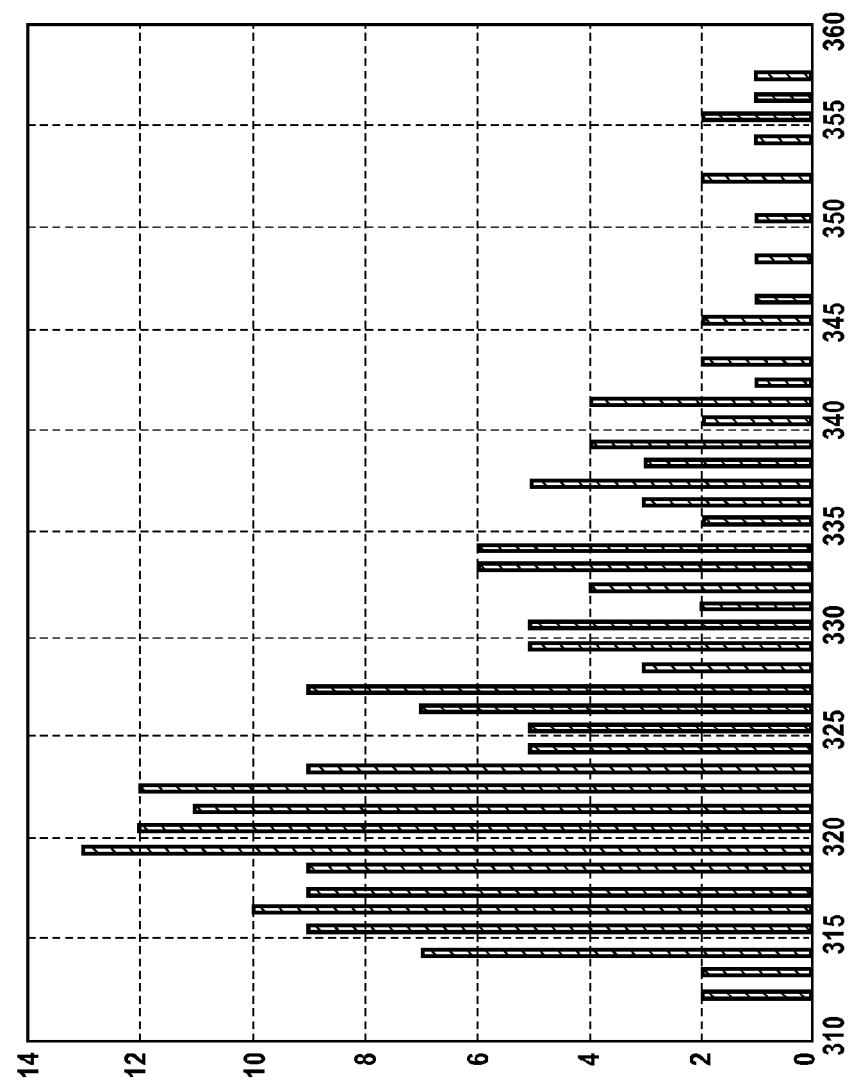

FIGS. 7A, 7B, and 7C are graphs illustrating simulations showing how long a system such as the system 300 takes to detect a signal. Each graph is a histogram showing the results of 200 simulations. The horizontal axis corresponds to time-until-detection in microseconds, and the vertical axis indicates the number of signals that took a particular amount of time to be detected. The graphs of FIGS. 7A, 7B and 7C all correspond to a receiver having three antennas and utilizing time domain averaging over four symbols. FIGS. 7A, 7B and 7C correspond to received signals having signal-to-noise ratios of −5 dB, −7 dB and −9 dB, respectively. In this particular simulation, detection occurring after 340 microseconds was considered to be late.

With a signal-to-noise ratio of −5 dB (FIG. 7A), all 200 signals were detected within 315 microseconds. With a signal-to-noise ratio of −7 dB (FIG. 7B), all 200 signals were detected within 324 microseconds. With a signal-to-noise ratio of −9 dB (FIG. 7C), 179 signals were detected within 340 microseconds, but 21 signals were detected late.

The example systems 200 and 300 may be implemented in hardware. For example, some or all of the system 200 and/or some or all of the system 300 may be implemented in, for example, a custom integrated circuit (IC), an application specific integrated circuit (ASIC), a field programmable logic array (FPGA), a programmable logic array (PLA), etc. Additionally or alternatively, some of the system 200 and/or some of the system 300 may be implemented in software stored in, for example, a memory and implemented on a processor or implemented in firmware as desired. For example, some of one or more of the controllers 264 may be implemented using software or firmware. If implemented in software, the routines may be stored in any computer readable memory such as in RAM, ROM, flash memory, a magnetic disk, a laser disk, or other storage medium. Likewise, this software may be delivered to a device (such as a transmitter, receiver, hard disk controller, etc.) via any known or desired delivery method including, for example, over a communication channel such as a telephone line, the Internet, a wireless connection, etc., or via a transportable medium, such as a computer-readable disk, flash drive, etc. Delivery methods may include, for example, delivery on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium).

Although the above-described systems and methods were described in the context of the IEEE 802.11b communication protocol, similar methods and systems may be utilized in other contexts in which a received signal is spread with a spreading code. The above-described methods, systems, etc., may be embodied in any type of device that receives a signal spread with a spreading code, such as communication devices for use in wired or wireless communication systems that utilize Barker codes. Referring now to FIGS. 8-13, various example devices that may utilize the above-described methods and systems are shown.

Figure 8:
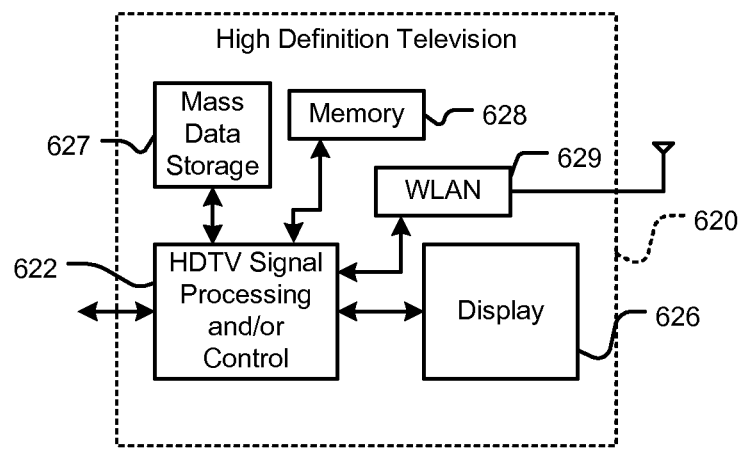
FIG. 8 is a block diagram of a high definition television that may utilize methods and systems such as described herein.

Referring to FIG. 8, such methods and systems may be utilized in a high definition television (HDTV) 620. The HDTV 620 includes signal processing and/or control circuits, which are generally identified in FIG. 8 at 622, a WLAN interface 629, and a mass data storage 627. Methods and systems such as described above may be utilized in the WLAN interface 629 or the signal processing circuit and/or control circuit 622, for example. HDTV 620 receives HDTV input signals in either a wired or wireless format and generates HDTV output signals for a display 626. In some implementations, signal processing circuit and/or control circuit 622 and/or other circuits (not shown) of HDTV 620 may process data, perform coding and/or encryption, perform calculations, format data and/or perform any other type of HDTV processing that may be required.

HDTV 620 may communicate with mass data storage 627 that stores data in a nonvolatile manner such as optical and/or magnetic storage devices. The mass data storage 627 may include one or more hard disk drives (HDDs) and/or one or more digital versatile disks (DVDs). One or more of the HDDs may be a mini HDD that includes one or more platters having a diameter that is smaller than approximately 1.8". HDTV 620 may be connected to memory 628 such as RAM, ROM, low latency nonvolatile memory such as flash memory and/or other suitable electronic data storage. HDTV 620 also may support connections with a WLAN via the WLAN network interface 629.

Figure 9:
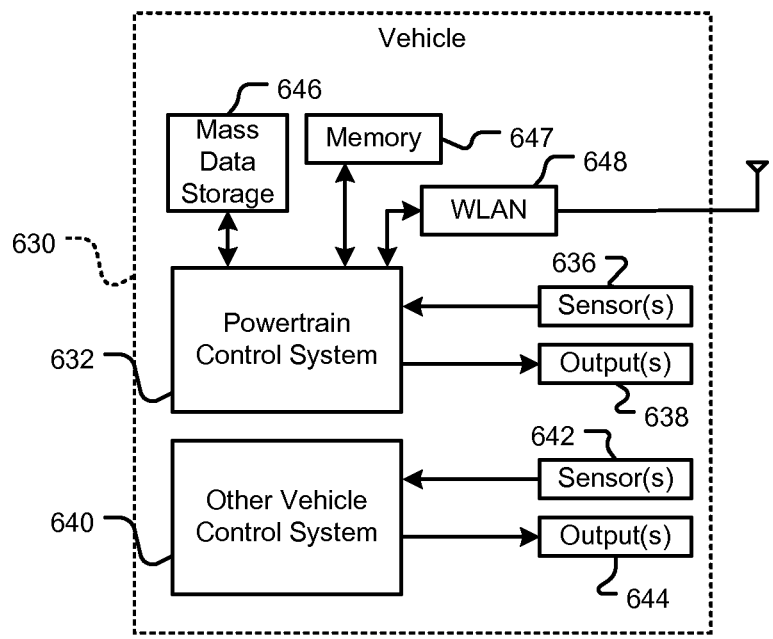
FIG. 9 is a block diagram of a vehicle that may utilize methods and systems such as described herein.

Referring now to FIG. 9, methods and systems such as described above may be utilized in a control system of a vehicle 630. In some implementations, a powertrain control system 632 receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

A control system 640 may likewise receive signals from input sensors 642 and/or output control signals to one or more output devices 644. In some implementations, control system 640 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 632 may communicate with mass data storage 646 that stores data in a nonvolatile manner. Mass data storage 646 may include optical and/or magnetic storage devices for example hard disk drives HDD and/or DVDs. One or more of the HDDs may be a mini HDD that includes one or more platters having a diameter that is smaller than approximately 1.8". Powertrain control system 632 may be connected to memory 647 such as RAM, ROM, low latency nonvolatile memory such as flash memory and/or other suitable electronic data storage. Powertrain control system 632 also may support connections with a WLAN via a WLAN network interface 648. Methods and systems such as described above may be implemented in the WLAN interface 648 or in the control system 640. The control system 640 may also include mass data storage, memory and/or a WLAN interface (all not shown).

Figure 10:
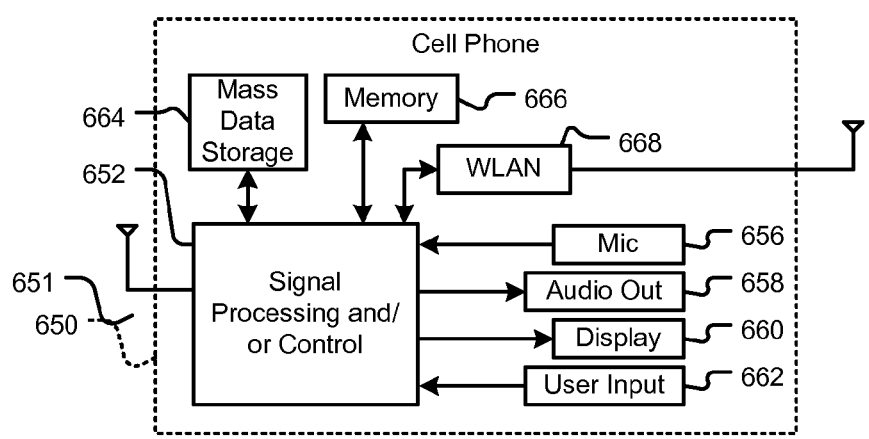
FIG. 10 is a block diagram of a cellular phone that may utilize methods and systems such as described herein.

Referring now to FIG. 10, methods and systems such as described above may also be utilized in a cellular phone 650 that may include a cellular antenna 651. The cellular phone 650 includes signal processing and/or control circuits, which are generally identified in FIG. 10 at 652, a WLAN interface 668, and a mass data storage 664. Methods and systems such as described above may be implemented in the signal processing and/or control circuits 652 and/or the WLAN interface 668, for example. In some implementations, cellular phone 650 includes a microphone 656, an audio output 658 such as a speaker and/or audio output jack, a display 660 and/or an input device 662 such as a keypad, pointing device, voice actuation and/or other input device. Signal processing and/or control circuits 652 and/or other circuits (not shown) in cellular phone 650 may process data, perform coding and/ or encryption, perform calculations, format data and/or perform other cellular phone functions.

Cellular phone 650 may communicate with mass data storage 664 that stores data in a nonvolatile manner such as optical and/or magnetic storage devices for example hard disk drives HDD and/or DVDs. At least one HDD may be a mini HDD that includes one or more platters having a diameter that is smaller than approximately 1.8". Cellular phone 650 may be connected to memory 666 such as RAM, ROM, low latency nonvolatile memory such as flash memory and/or other suitable electronic data storage. Cellular phone 650 also may support connections with a WLAN via a WLAN network interface 668.

Figure 11:
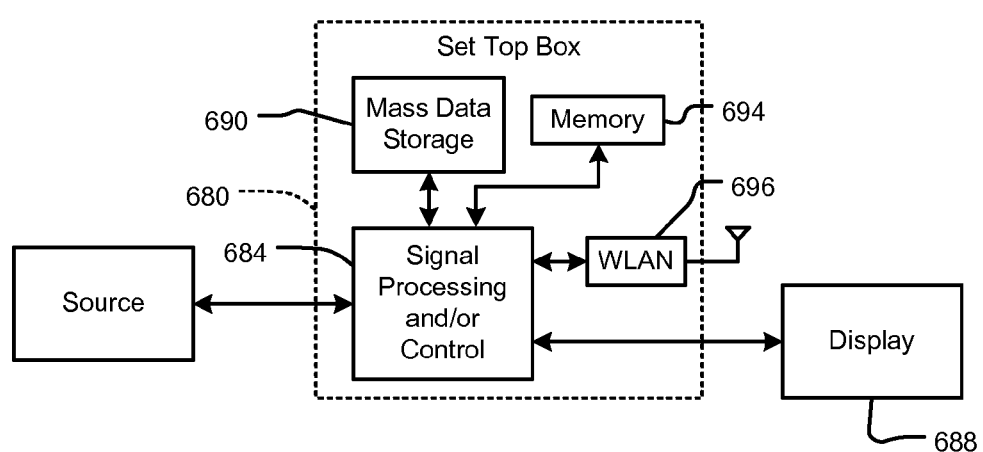
FIG. 11 is a block diagram of a set top box that may utilize methods and systems such as described herein.

Referring now to FIG. 11, methods and systems such as described above may be utilized in a set top box 680. The set top box 680 includes signal processing and/or control circuits, which are generally identified in FIG. 10 at 684, a WLAN interface 696, and a mass data storage device 690. Methods and systems such as described above may be implemented in the signal processing and/or control circuits 684 and/or the WLAN interface 696, for example. Set top box 680 receives signals from a source such as a broadband source and outputs standard and/or high definition audio/video signals suitable for a display 688 such as a television and/or monitor and/or other video and/or audio output devices. Signal processing and/or control circuits 684 and/or other circuits (not shown) of the set top box 680 may process data, perform coding and/or encryption, perform calculations, format data and/or perform any other set top box function.

Set top box 680 may communicate with mass data storage 690 that stores data in a nonvolatile manner. Mass data storage 690 may include optical and/or magnetic storage devices for example hard disk drives HDD and/or DVDs. At least one HDD may be a mini HDD that includes one or more platters having a diameter that is smaller than approximately 1.8". Set top box 680 may be connected to memory 694 such as RAM, ROM, low latency nonvolatile memory such as flash memory and/or other suitable electronic data storage. Set top box 680 also may support connections with a WLAN via the WLAN network interface 696.

Figure 12:
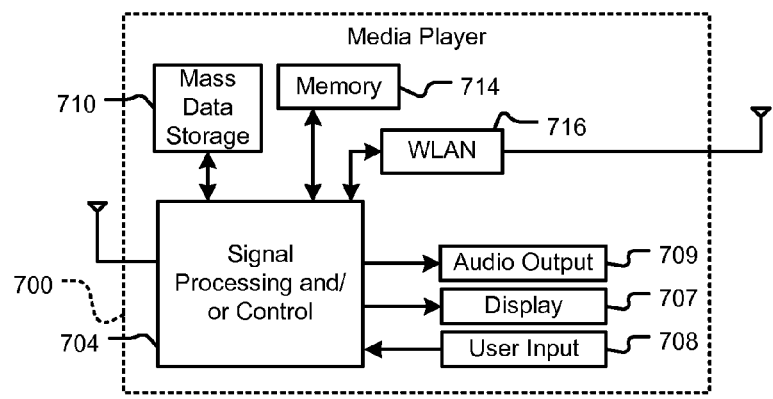
FIG. 12 is a block diagram of a media player that may utilize methods and systems such as described herein.

Referring now to FIG. 12, methods and systems such as described above may be utilized in a media player 700. The media player 700 may include signal processing and/or control circuits, which are generally identified in FIG. 12 at 704, a WLAN interface 716, and a mass data storage device 710. Methods and systems such as described above may be implemented in the signal processing and/or control circuits 704 and/or the WLAN interface 716, for example. In some implementations, media player 700 includes a display 707 and/or a user input 708 such as a keypad, touchpad and the like. In some implementations, media player 700 may employ a graphical user interface (GUI) that typically employs menus, drop down menus, icons and/or a point-and-click interface via display 707 and/or user input 708. Media player 700 further includes an audio output 709 such as a speaker and/or audio output jack. Signal processing and/or control circuits 704 and/or other circuits (not shown) of media player 700 may process data, perform coding and/or encryption, perform calculations, format data and/or perform any other media player function.

Media player 700 may communicate with mass data storage 710 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may be a mini HDD that includes one or more platters having a diameter that is smaller than approximately 1.8". Media player 700 may be connected to memory 714 such as RAM, ROM, low latency nonvolatile memory such as flash memory and/or other suitable electronic data storage. Media player 700 also may support connections with a WLAN via a WLAN network interface 716. Still other implementations in addition to those described above are contemplated.

Figure 13:
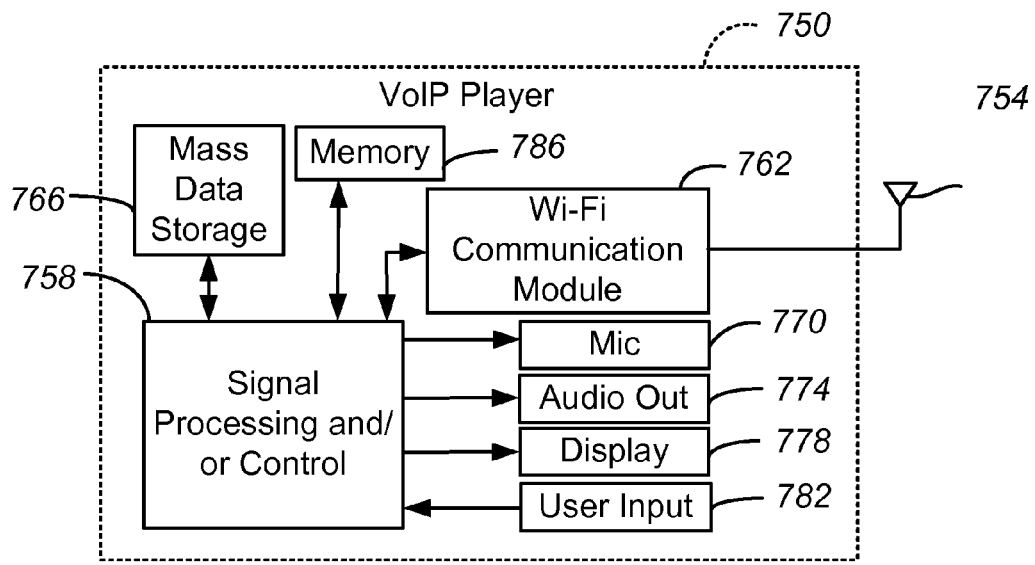
FIG. 13 is a block diagram of a voice over IP device that may utilize methods and systems such as described herein.

Referring to FIG. 13, methods and systems such as described above may be utilized in a Voice over Internet Protocol (VoIP) phone 750 that may include an antenna 754, signal processing and/or control circuits 758, a wireless interface 762, and a mass data storage 766. Methods and systems such as described above may be implemented in the signal processing and/or control circuits 758 and/or the wireless interface 762, for example. In some implementations, VoIP phone 750 includes, in part, a microphone 770, an audio output 774 such as a speaker and/or audio output jack, a display monitor 778, an input device 782 such as a keypad, pointing device, voice actuation and/or other input devices, and a Wireless Fidelity (Wi-Fi) communication module 762. Signal processing and/or control circuits 758 and/or other circuits (not shown) in VoIP phone 750 may process data, perform coding and/or encryption, perform calculations, format data and/or perform other VoIP phone functions.

VoIP phone 750 may communicate with mass data storage 766 that stores data in a nonvolatile manner such as optical and/or magnetic storage devices, for example hard disk drives HDD and/or DVDs. The HDD may be a mini HDD that includes one or more platters having a diameter that is smaller than approximately 1.8". VoIP phone 750 may be connected to memory 786, which may be a RAM, ROM, low latency nonvolatile memory such as flash memory and/or other suitable electronic data storage. VoIP phone 750 is configured to establish communications link with a VoIP network (not shown) via Wi-H communication module 762.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method of generating information for use in detecting a signal, the method comprising:

generating a plurality of respective correlation signals from i) a plurality of received signals and ii) a spreading sequence, wherein the plurality of received signals correspond to a plurality of respective antennas, each received signal includes an in-phase (I) signal and a quadrature (Q) signal, and each generated correlation signal includes an I correlation signal and a Q correlation signal;

generating a plurality of respective magnitude signals from the plurality of correlation signals, each magnitude signal generated by adding i) the maximum of the magnitudes of a respective I correlation signal and a respective Q correlation signal with ii) a fraction of the minimum of the magnitudes of the respective I correlation signal and the respective Q correlation signal, wherein the respective I correlation signal and the respective Q correlation signal are outputs from a respective correlator;

generating a respective plurality of time-delayed versions for each of the plurality of respective magnitude signals, wherein each of the time-delayed versions in the respective plurality of time-delayed versions is delayed by a respective integer number of symbol periods;

generating a plurality of time-domain averaged signals for the plurality of respective magnitude signals, wherein each of the plurality of time-domain averaged signals is generated based on i) the respective magnitude signal and ii) the respective plurality of time-delayed versions for the respective magnitude signal;

generating a first spatial-domain averaged signal based on the plurality of magnitude signals;

generating a second spatial-domain averaged signal based on the plurality of time-domain averaged signals; and generating a multiple antenna peak-to-average signal based on i) the first spatial-domain averaged signal and ii) the second spatial-domain averaged signal.

2. A method according to claim 1, wherein generating the first spatial-domain averaged signal comprises generating a weighted average of the plurality of magnitude signals.

3. A method according to claim 1, further comprising:
comparing the multiple antenna peak-to-average signal to a threshold; and
generating an indicator of signal detection based on whether the multiple antenna peak-to-average signal exceeded the threshold.

4. A method according to claim 1, further comprising:
generating a plurality of individual antenna peak-to-average signals based on the plurality of time-domain averaged signals;
comparing the multiple antenna peak-to-average signal and the plurality of individual antenna peak-to-average signals to respective thresholds; and
generating an indicator of signal detection based on whether the multiple antenna peak-to-average signal and the plurality of individual antenna peak-to-average signals exceeded the respective thresholds.

5. A method according to claim 4, wherein the threshold corresponding to the multiple antenna peak-to-average signal is i) a first threshold and each of the thresholds corresponding to the plurality of individual antenna peak-to-average signals is ii) a second threshold different than the first threshold.

6. A method according to claim 1, wherein the fraction is $13/32$.

7. A system for detecting a transmitted signal, the system comprising:
a plurality of correlators to correlate respective received signals corresponding to a plurality of antennas with a spreading sequence, wherein each received signal includes an in-phase (I) signal and a quadrature (Q) signal;

a plurality of magnitude calculators, each magnitude calculator coupled to a respective one of the plurality of correlators, to generate a plurality of magnitude signals based on outputs of the plurality of correlators, wherein each magnitude signal is based on a summation of i) the maximum of the magnitudes of an respective I correlation signal and a respective Q correlation signal with ii) a fraction of the minimum of the magnitudes of the respective I correlation signal and the respective Q correlation signal of the output from the respective correlator, wherein the respective I correlation signal and the respective Q correlation signal are outputs from a respective correlator;

a plurality of time-domain averaging units coupled to the plurality of magnitude calculators to generate i) a respective plurality of time-delayed versions for each of the plurality of respective magnitude signals and ii) a plurality of time-domain averaged signals for the plurality of respective magnitude signals, wherein each of the time-delayed versions of the respective plurality of time-delayed versions is delayed by a respective integer number of symbol periods and wherein each of the plurality of time-domain averaged signals is generated based on i) the respective magnitude signal and ii) the respective plurality of time-delayed versions for the respective magnitude signal;

a spatial-domain averaging unit coupled to i) the plurality of magnitude calculators to generate a first spatial-domain averaged signal based on outputs of the plurality of magnitude calculators and ii) the plurality time-domain averaging units to generate a second spatial-domain averaged signal based on the outputs of the plurality of time-domain averaging units; and a multiple antenna peak-to-average signal generator to generate a multiple antenna peak-to-average signal based on the first spatial-domain averaged signal and second spatial-domain averaged signal.

8. A system according to claim 7, further comprising a threshold comparator to:
compare the multiple antenna peak-to-average signal to a threshold; and
generate an indicator of signal detection based on whether the multiple antenna peak-to-average signal exceeded the threshold.

9. A system according to claim 7, wherein the fraction is $13/2$.

* * * * *